US012662233B2

(12) United States Patent
Wilkinson et al.

(10) Patent No.: US 12,662,233 B2
(45) Date of Patent: Jun. 23, 2026

(54) FOLDING STEP SYSTEM

(71) Applicant: Bell Textron Inc., Fort Worth, TX (US)

(72) Inventors: Michael Ross Wilkinson, North Richland Hills, TX (US); James Everett Kooiman, Fort Worth, TX (US); Clegg Benjamin Brian Smith, Fort Worth, TX (US); Jeffrey Matthew Williams, Aledo, TX (US); Tjepke Heeringa, Dallas, TX (US); David G. Carlson, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/569,167

(22) Filed: Jan. 5, 2022

(65) Prior Publication Data

US 2023/0211868 A1     Jul. 6, 2023

(51) Int. Cl.
*B64C 1/24* (2006.01)

(52) U.S. Cl.
CPC .................................... *B64C 1/24* (2013.01)

(58) Field of Classification Search
CPC ........... B64C 1/24; B64C 1/0009; B64D 9/00; B60R 3/02; B60R 3/007
See application file for complete search history.

(56) References Cited

U.S. PATENT DOCUMENTS

| | | | | |
|---|---|---|---|---|
| 1,953,298 A | * | 4/1934 | Goodwin ............... | B61D 23/02 |
| | | | | 280/166 |
| 2,158,949 A | * | 5/1939 | Sarles ..................... | E06C 1/387 |
| | | | | 280/166 |
| 2,196,546 A | * | 4/1940 | Bowers ................. | B64C 1/1415 |
| | | | | 244/129.5 |
| 2,417,987 A | * | 3/1947 | McFarland ............... | B64C 1/24 |
| | | | | 114/65 R |
| 2,951,454 A | * | 9/1960 | Candlin, Jr. ........... | B61D 23/02 |
| | | | | 280/166 |
| 4,440,364 A | * | 4/1984 | Cone ......................... | B64C 1/24 |
| | | | | 16/370 |
| 4,453,684 A | * | 6/1984 | Hanks ....................... | B64C 1/24 |
| | | | | 105/430 |
| 4,750,753 A | * | 6/1988 | Dezern ..................... | B60R 3/02 |
| | | | | 224/497 |
| 5,228,707 A | * | 7/1993 | Yoder ....................... | B60R 3/02 |
| | | | | 182/127 |
| 5,358,067 A | * | 10/1994 | Ford ....................... | E06C 1/005 |
| | | | | 182/35 |

(Continued)

OTHER PUBLICATIONS

Simple & Stylish DIY Murphy Beds, Renovation Semi-Pros (Jul. 21, 2019), https://renosemipros.com/diy-murphy-beds/ (last visited Dec. 1, 2022) (Year: 2019).*

*Primary Examiner* — Philip J Bonzell
(74) *Attorney, Agent, or Firm* — Lightfoot & Alford PLLC

(57) ABSTRACT

A folding step system includes a housing forming an interior space and a step comprising a step surface. The step is movable between a stowed configuration in which substantially all of the step surface is disposed within the interior space and a deployed configuration in which at least a portion of the step surface is disposed outside of the interior space and at least a portion of the step surface is disposed within the interior space.

16 Claims, 11 Drawing Sheets

(56) References Cited

U.S. PATENT DOCUMENTS

| | | | | |
|---|---|---|---|---|
| 5,538,265 | A * | 7/1996 | Chen | B60R 3/02 |
| | | | | 280/166 |
| 8,905,354 | B2 * | 12/2014 | Griffiths | B64C 1/24 |
| | | | | 182/89 |
| 10,486,790 | B2 * | 11/2019 | Steindl | B64C 1/24 |
| 10,723,273 | B1 * | 7/2020 | Gray | B60R 3/02 |
| 10,807,696 | B2 * | 10/2020 | Singleton | E06C 1/005 |
| 11,407,514 | B2 * | 8/2022 | Puglisi | E06C 1/005 |
| 2011/0272524 | A1 * | 11/2011 | Gorlich | B64C 1/24 |
| | | | | 244/129.6 |
| 2018/0105253 | A1 * | 4/2018 | Singleton | B64C 1/24 |
| 2019/0061902 | A1 * | 2/2019 | Scannell | B64C 7/00 |
| 2020/0216160 | A1 * | 7/2020 | Griffiths | E05D 15/10 |
| 2021/0001927 | A1 * | 1/2021 | Diehl | B60R 3/02 |

* cited by examiner

206

222

202

216

218

FOLDING STEP SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

While it is not uncommon for aircraft to include folding steps carried by a fuselage, conventional folding steps generally comprise features that degrade aerodynamic performance of the aircraft. Further, conventional folding steps typically provide a footing surface that provides a limited amount of surface area for contact with a user's foot. Accordingly, there remains a need for a step system that provide both improved footing as well as improved aerodynamic performance.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
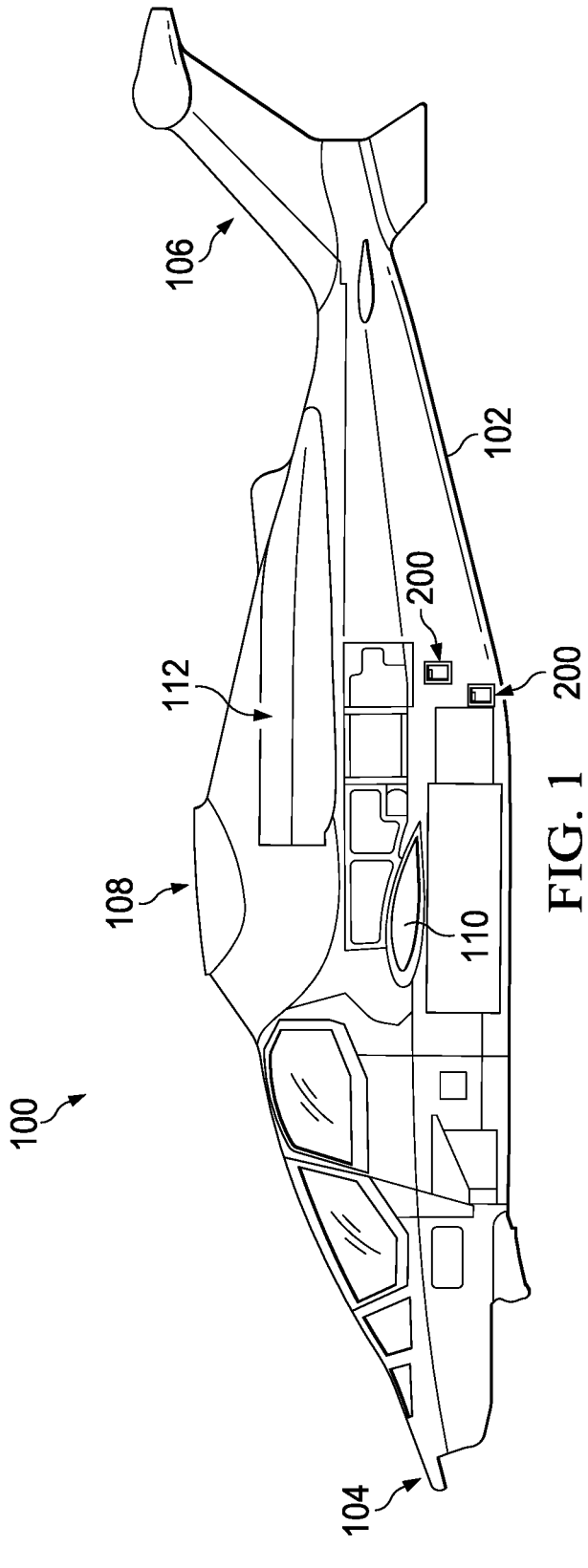
FIG. 1 is a side view of an aircraft according to an embodiment of this disclosure having a folding step system according to an embodiment of this disclosure.
Figure 2:
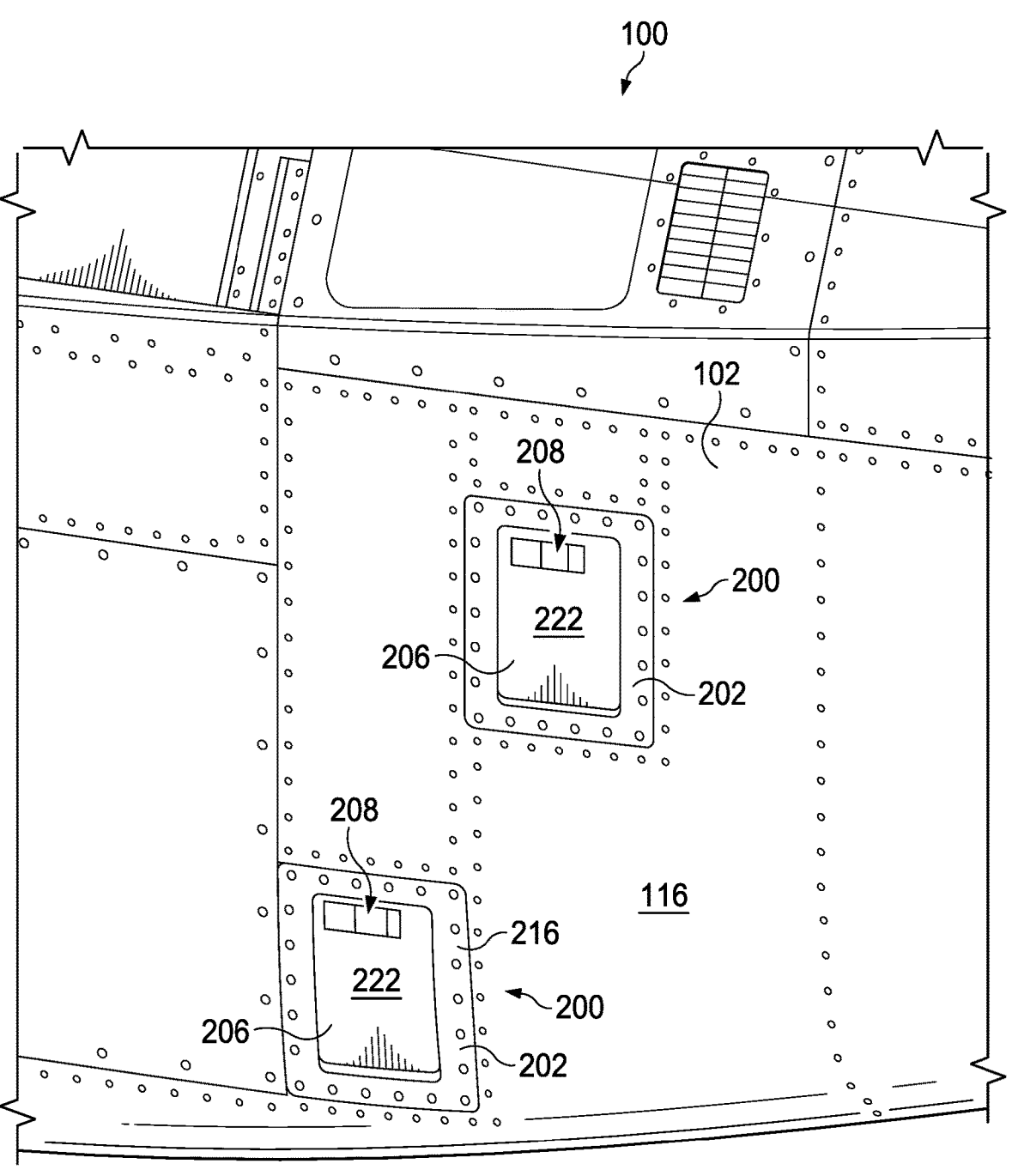
FIG. 2 is an oblique view of a portion of the aircraft of FIG. 1 showing the folding step system in a stowed configuration.
Figure 3:
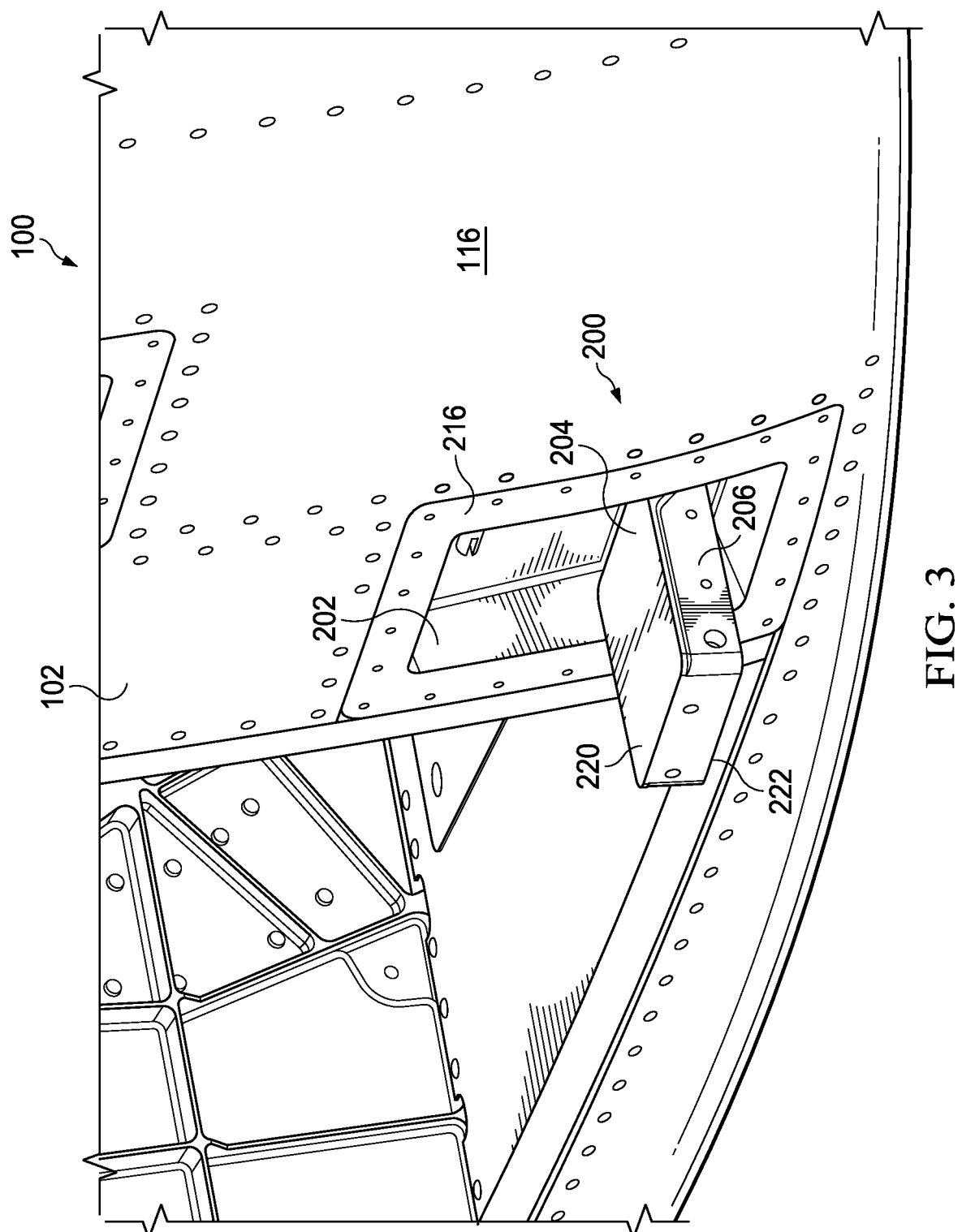
FIG. 3 is an oblique view of a portion of the aircraft of FIG. 1 showing the folding step system in a deployed configuration.
Figure 4:
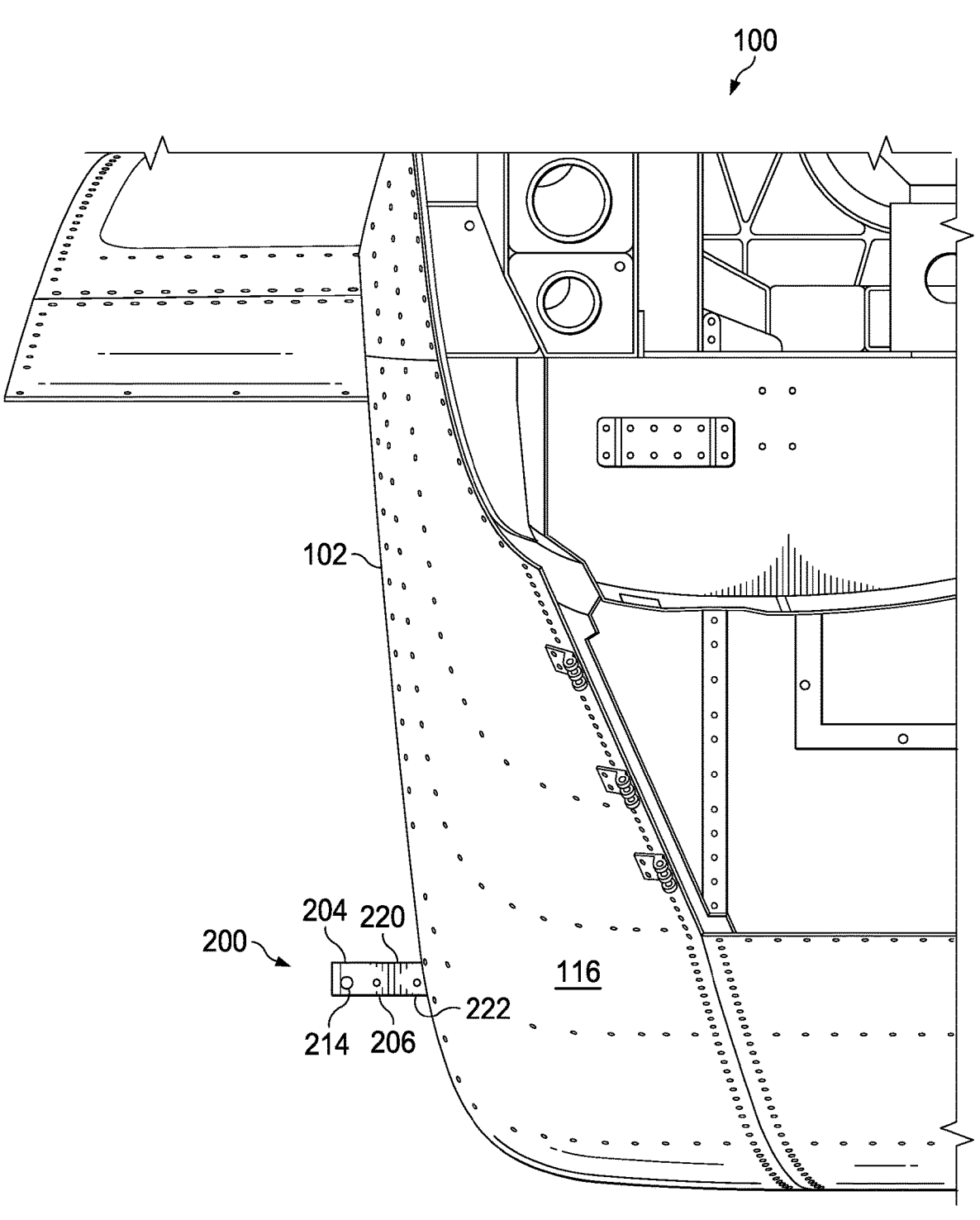
FIG. 4 is a rear view of a portion of the aircraft of FIG. 1 showing the folding step system in a deployed configuration.
Figure 5:
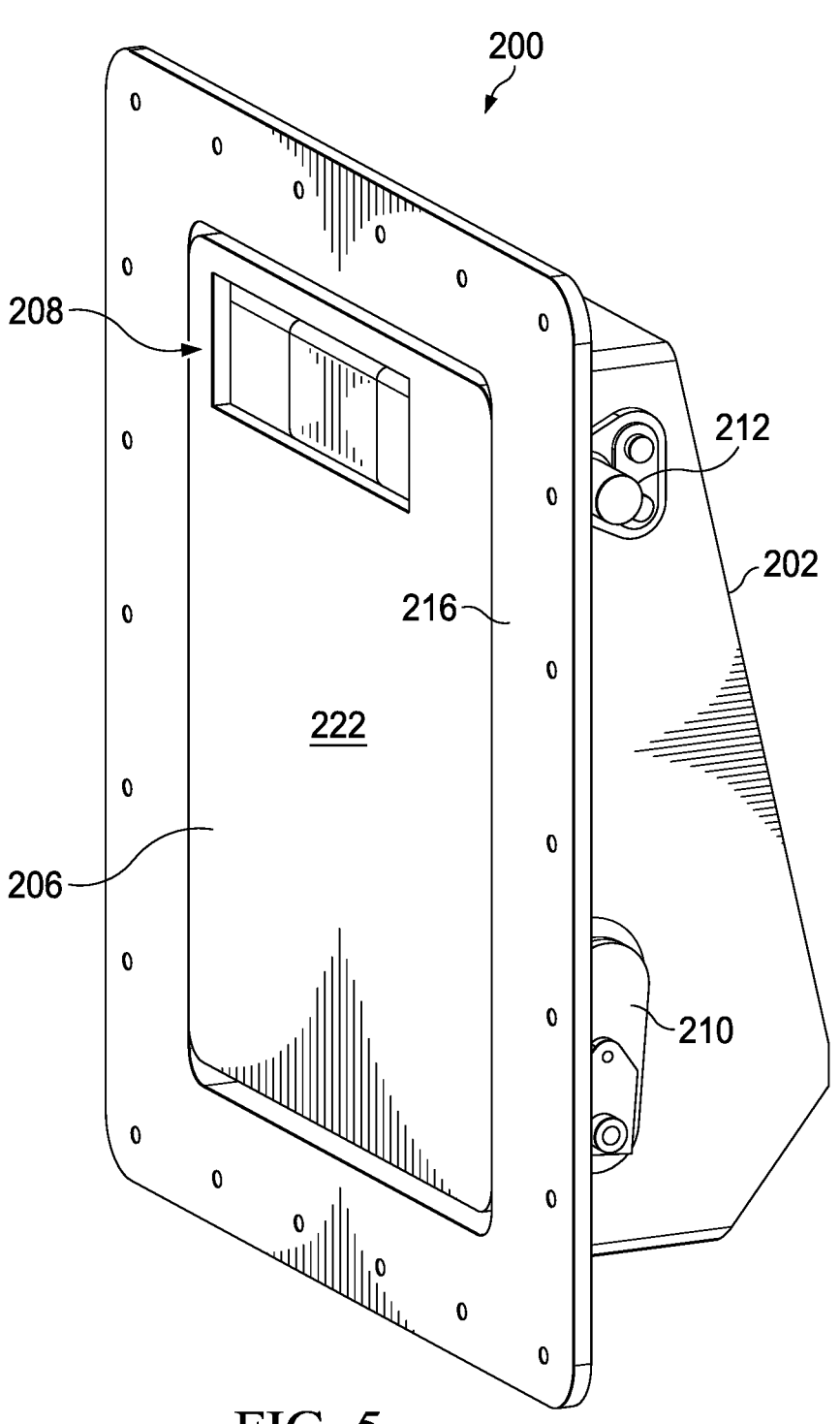
FIG. 5 is an oblique view the folding step system of FIG. 1 shown in isolation and in a stowed configuration.
Figure 6:
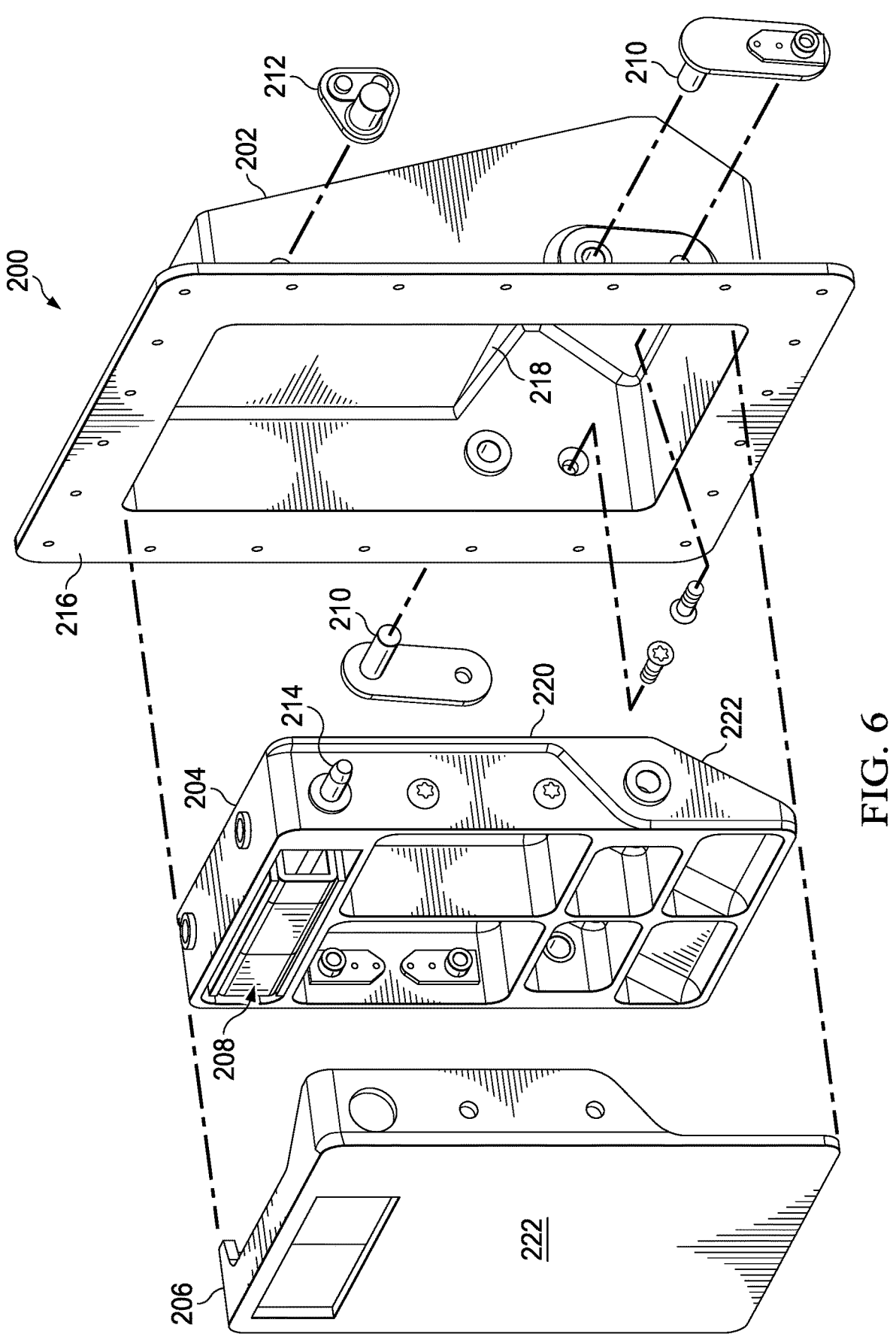
FIG. 6 is an oblique exploded view of the folding step system of FIG. 1 in a stowed configuration.
Figures 7, 8:
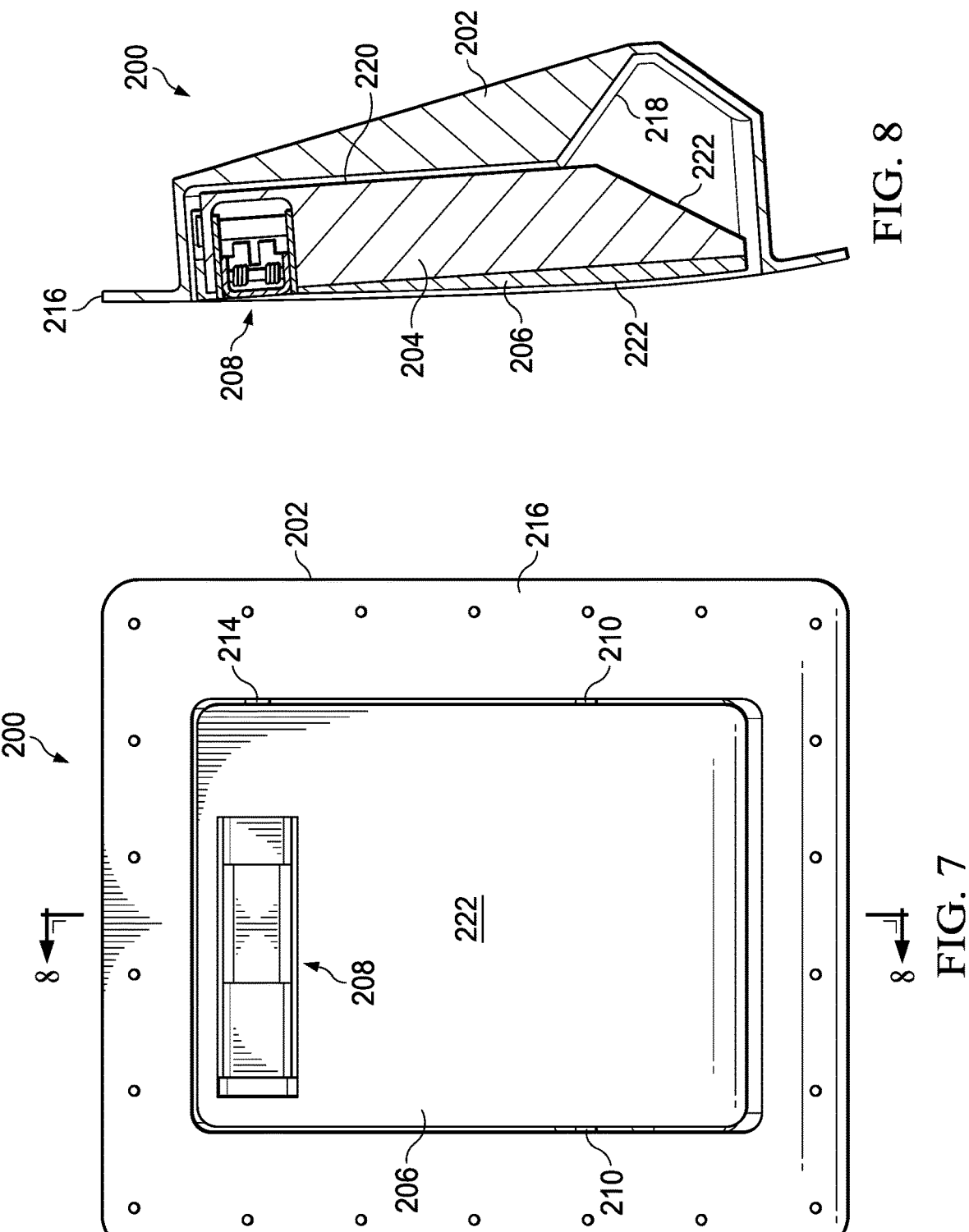
FIG. 7 is a front view of the folding step system of FIG. 1 shown in isolation and in a stowed configuration.
FIG. 8 is a cross-sectional side view of the folding step system of FIG. 1 shown in isolation and in a stowed configuration.
Figures 9, 10:
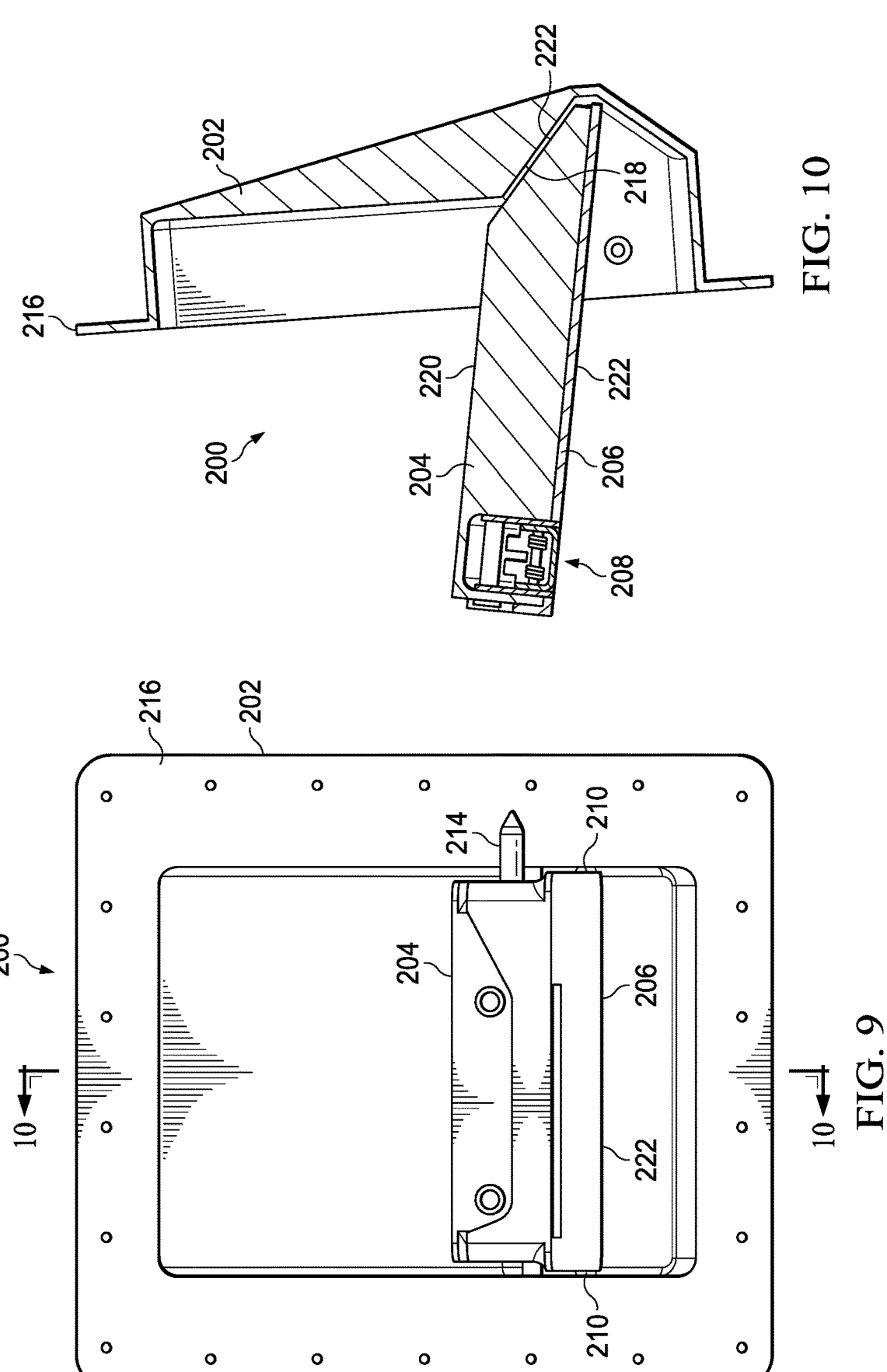
FIG. 9 is a front view of the folding step system of FIG. 1 shown in isolation and in a deployed configuration.
FIG. 10 is a cross-sectional side view of the folding step system of FIG. 1 shown in isolation and in a deployed configuration.
Figure 11:
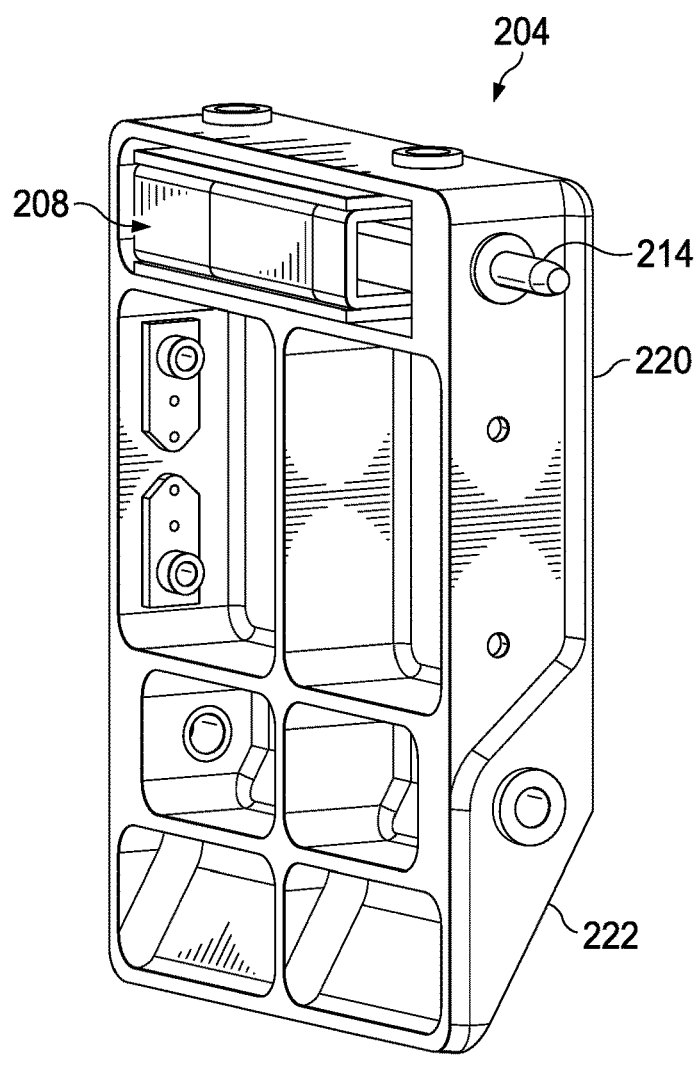
FIG. 11 is an oblique view of a step of the folding step system of FIG. 1 shown in isolation.
Figure 12:
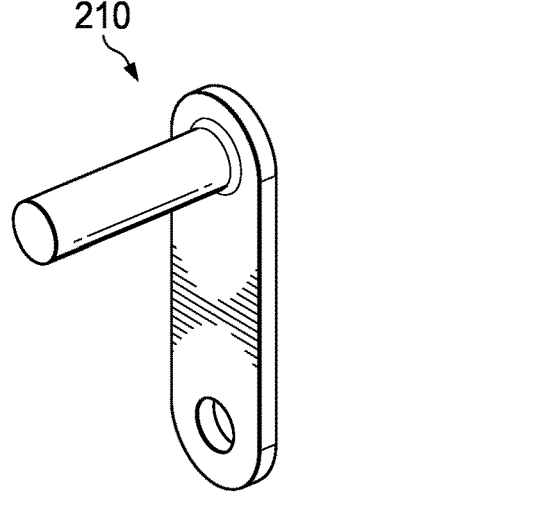
FIG. 12 is an oblique view of a hinge pin of the folding step system of FIG. 1 shown in isolation.
Figure 13:
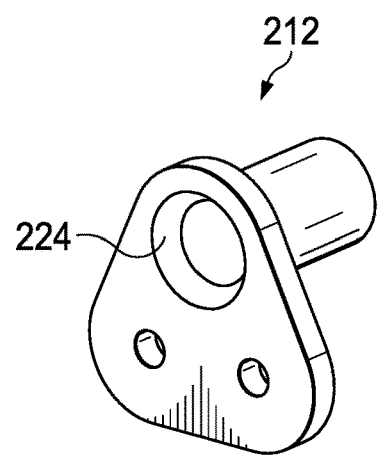
FIG. 13 is an oblique view of a lock pin receiver of the folding step system of FIG. 1 shown in isolation.
Figure 15:
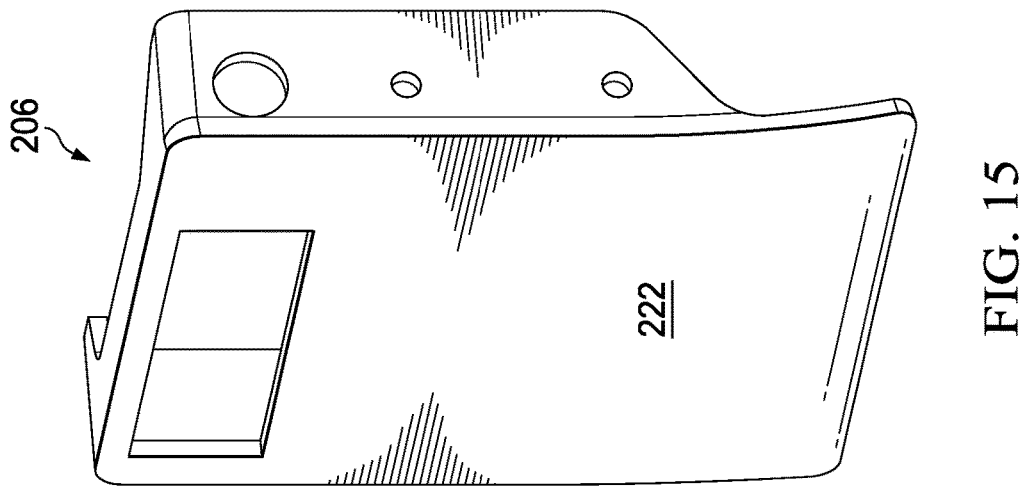
FIG. 15 is an oblique view of a step cover of the folding step system of FIG. 1 shown in isolation.

Referring now to FIGS. 1-4, and aircraft 100 is shown as comprising a fuselage 102, a nose 104, a tail 106, a rotor region 108, a wing 110, and an engine region 112. In some cases, such as, but not limited to, scenarios where access to one or more of rotor region 108 and engine region 112 is needed, one or more folding step systems 200 carried by aircraft 100 can be utilized. Most generally, and as will be described below, folding step systems 200 are disposed after relative to at least a portion of rotor region 108 and are conveniently located a long an exterior of fuselage 102 so that upon deployment from a stowed configuration a user can safely ascend the exterior of fuselage 102 and gain access to rotor region 108 or engine region 112. FIGS. 1 and 2 show folding step system (FSS) 200 in a stowed configuration wherein folding step system 200 presents minimal aerodynamic drag during movement of aircraft 100. FIGS. 3 and 4 show FSS 200 in a deployed configuration wherein FSS 200 presents a stable footing for ascending along the exterior of fuselage 102.

Referring now to FIGS. 5-10, FSS 200 generally comprises a housing 202, a step 204, and a cover 206. FSS further comprises a latch mechanism 208 carried by step 204. In this embodiment, hinge pins 210 carried by housing 202 are used to rotatably secure step 204 relative to housing 202. Additionally, a lock pin receiver 212 carried by housing 202 is used to selectively receive a lock pin 214 of latch mechanism 208 to selectively lock and unlock FSS 200 in the stowed configuration.

Figure 14:
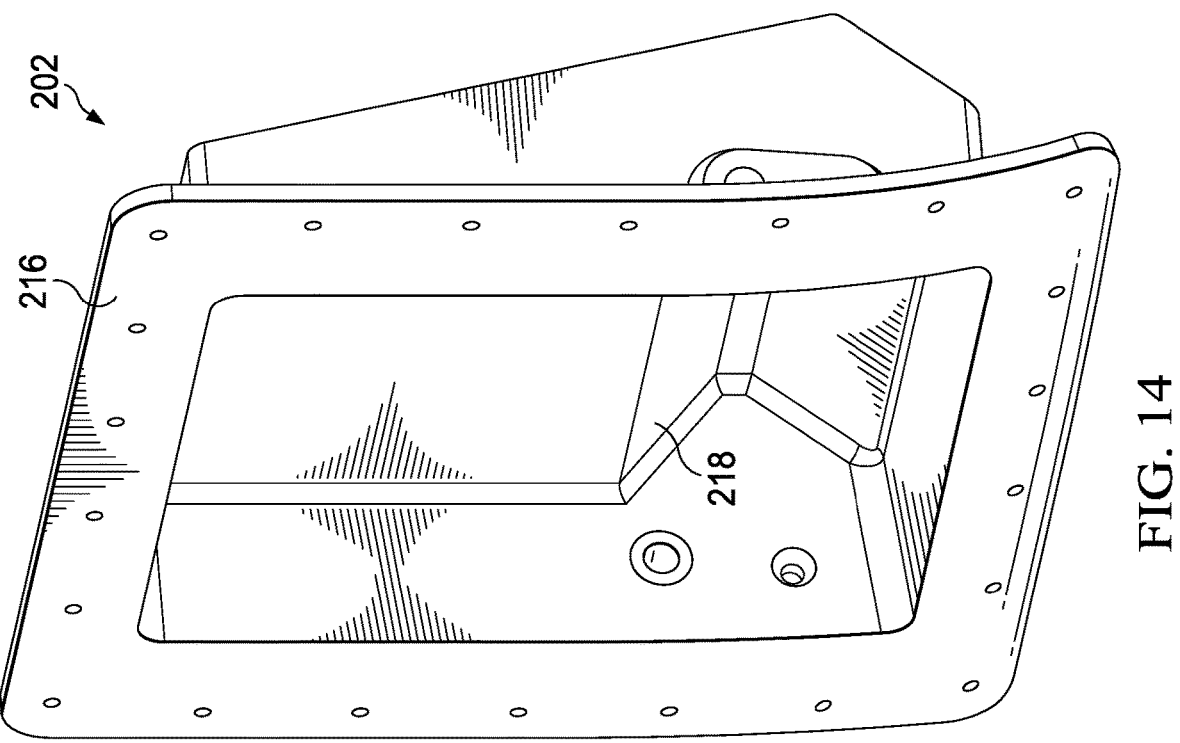
FIG. 14 is an oblique view of a housing of the folding step system of FIG. 1 shown in isolation.
Figure 16:
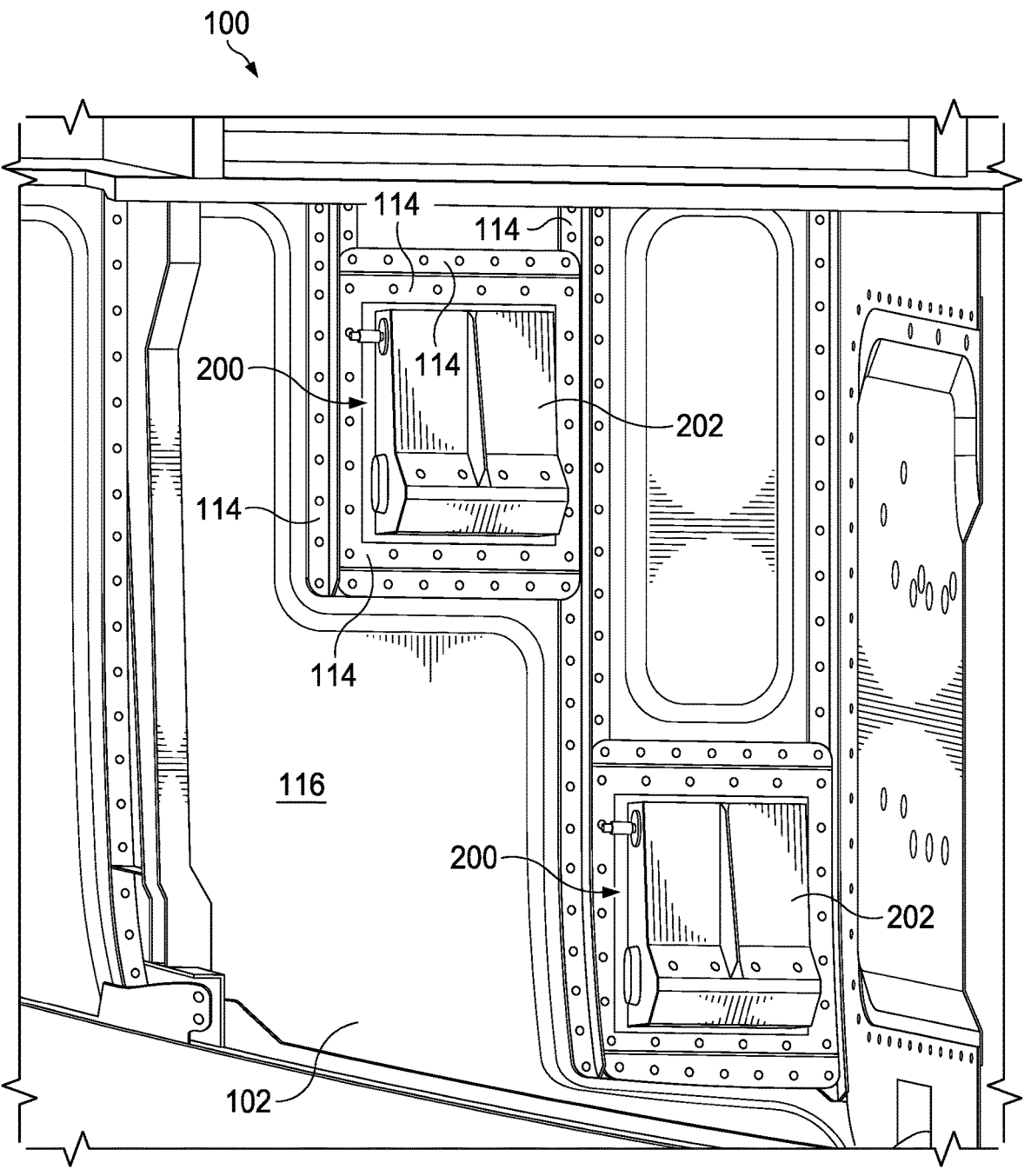
FIG. 16 is a partial oblique rear view of the folding step system of FIG. 1 as installed on the aircraft of FIG. 1.

Referring additionally to FIGS. 14 and 16, an external flange 216 of housing 202 matches the contour and profile of the outer shape of fuselage 102 even where the fuselage 102 exterior comprises complex curves. Housing 202 further comprises a load reaction surface 218 that can be scaled for implementation of different embodiments. Further, housing 202 is removable from fuselage 102 thereby selectively providing access to an interior of the fuselage 102 from outside the fuselage 102. In this embodiment, hinge pins 210 are independently inserted through holes of housing 202 which allows quick disassembly of FSS 200.

Referring now to FIGS. 5-10 and 11, step 204 comprises a substantially continuous step surface 220 configured to provide a stable platform for a user to stand on. Step 204 further also includes a load transmitting surface 222 configured to selectively interact with load reaction surface 218 so that when downward force is applied to a deployed step 204 via the step surface 220, loads are reacted through hinge pins 210 and from load transmitting surface 222 to housing 202 via load reaction surface 218. Step 204 can be common to multiple or all foldable step systems on an aircraft, regardless of location on the aircraft and regardless of the outer profile of the fuselage of the aircraft. In some embodiments, an alternative embodiment of step surface can be elongated so that it extends further away from fuselage when deployed so that the folding step system is accessible by a user even though the step is located under the aircraft or in a laterally inward portion of a fuselage. In some embodiments, lock pin 214 can be retained with a pressed in bushing and hinge pins 210 can be inserted into the corresponding bushings.

Referring now to FIGS. 5-10 and 15, cover 206 comprises an exterior surface 224 configured to complement the exterior profile of the surrounding fuselage 102 exterior. While the step 204 can be advantageously used at various location on fuselage 102 without alteration, cover 206, in this embodiment, is configured to reduce aerodynamic impacts of FSS 200 to aircraft 100. It follows that alternative embodiments of covers 206 can be provided wherein the exterior surface of the alternative embodiments are configured to have different shape profiles than shown. Accordingly, a variety of differently shaped covers can be provided so that FSS 200 can be located anywhere along fuselage 102 without negatively impacting aerodynamic performance of aircraft 100. In some cases, covers can comprise printed plastic that allows for easy repair and replacement if damaged in the field.

Referring now to FIGS. 5-10 and 12, like steps 204, hinge pins 210 can be common to multiple FSS 200. In this embodiment, hinge pins 210 are provided with adequate surface area for sealing against external particles and moisture from entering an interior space of steps 204. Further, hinge pins 210 are configured to easily slip in and out of each of housing 202 and step 204 for quick disassembly.

Referring now to FIGS. 5-10 and 13, lock pin receiver 212 provides a sealed retaining feature to housing 202. A tapered entrance 226 provides a self-aligning feature to guide the lock pin 214 when lock pin 214 is not yet fully aligned with lock pin receiver 212. Lock pin receivers 212 can be utilized on FSSs regardless of location of the FSS relative to a fuselage.

It will further be appreciated that while the systems disclosed herein are discussed in the context of providing folding step system in an aircraft, the same essential components and methodologies can be utilized in any other system to provide folding step that can be deployed and stowed. Further, it will be appreciated that the location of hinge pins can be provided at different locations to provide a different axis of rotation location and a different amount of stability when standing on the step. In the embodiment shown, a user can insert a significant portion of a foot within the housing 202, but not enough to cause undesirable rotation of the step 204. In the embodiments shown, FSS 200 is attached to and carried by fuselage 102 by attachment to one or more fuselage supports 114 along an interior of fuselage skins 116. However, in alternative embodiment, FSS 200 can be carried directly by skins 116 or any other suitable structure.

Still further, embodiments disclosed herein can provide a FSS comprising a hinged step substantially anywhere along the outer surface of a fuselage, even complex curved surfaces, while still minimizing gaps to reduce aerodynamic degradation and/or inefficiencies. Further, it will be appreciated that the step surface and other components of the step of an FSS can comprise any suitable shape, including shapes selected to improve human factors and user comfort. The step surface and other components of a step can be provided as desired without substantial consideration or dependence on the exterior profile of the fuselage, such as by providing a substantially flat step surface while the FSS is associated with a complex profile, such as, but not limited to, an organic or natural fuselage profile.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A folding step system, comprising:

a housing forming an interior space; and a step comprising a step surface and a planar load transmitting surface for selectively contacting a planar load reaction surface of the housing, the step being movable between a stowed configuration in which the step surface is disposed within the interior space and a deployed configuration in which at least a portion of the step surface is disposed outside of the interior space and at least a portion of the step surface is disposed within the interior space;

wherein at least a portion of the planar load transmitting surface is disposed deeper within the interior space when the step is in the deployed configuration as compared to a maximum depth within the interior space of the step surface when the step is in the stowed configuration;

wherein the step is limited to rotational movement relative to the housing about a rotation axis fixed relative to the housing in both the stowed configuration and the deployed configuration;

wherein the planar load reaction surface is higher than the planar load transmitting surface when the folding step system is in a first orientation and when viewed from a first point of view;

wherein the step surface is relatively higher than all portions of the planar load transmitting surface and the planar load reaction surface when the step is in the deployed configuration while the folding step system is in the first orientation and while viewed from the first point of view; and at least one of (1) wherein the planar load transmitting surface extends along a plane that is not parallel to a longitudinally central planar portion of the step surface that is completely disposed outside the housing when the step is in the deployed configuration and (2) wherein a latch mechanism is disposed at least partially within the step, the entirety of the latch mechanism is offset from the rotation axis, and the latch mechanism is selectively operable by movement of the latch mechanism in a direction substantially parallel to the rotation axis.

2. The folding step system of claim 1, wherein the step surface comprises a continuous surface.

3. The folding step system of claim 1, further comprising:

a lock pin receiver carried by the housing and configured to selectively receive a locking pin of the latch mechanism.

4. The folding step system of claim 3, wherein the latch mechanism comprises a biasing mechanism configured to selectively assist movement of the locking pin.

5. The folding step system of claim 1, further comprising:

a cover carried by the step and disposed generally opposite the step surface.

6. The folding step system of claim 5, wherein the housing further comprises a flange surrounding a perimeter of the cover.

7. An aircraft, comprising:

a fuselage comprising an exterior profile; and a folding step system, comprising:

a housing forming an interior space; and a step comprising a step surface and a planar load transmitting surface for selectively contacting a planar load reaction surface of the housing, the step movable between a stowed configuration in which the step surface is disposed within the interior space and a deployed configuration in which at least a portion of the step surface is disposed outside of the interior space and at least a portion of the step surface is disposed within the interior space;

wherein at least a portion of the planar load transmitting surface is disposed deeper within the interior space when the step is in the deployed configuration as compared to a maximum depth within the interior space of the step surface when the step is in the stowed configuration;

wherein the step is limited to rotational movement relative to the housing about a rotation axis fixed relative to the housing in both the stowed configuration and the deployed configuration;

wherein the planar load reaction surface is higher than the planar load transmitting surface when the folding step system is in a first orientation and viewed from a first point of view;

wherein the step surface is relatively higher than all portions of the planar load transmitting surface and the planar load reaction surface when the step is in the deployed configuration while the folding step system is in the first orientation and while viewed from the first point of view; and at least one of (1) wherein the planar load transmitting surface extends along a plane that is not parallel to a longitudinally central planar portion of the step surface that is completely disposed outside the housing when the step is in the deployed configuration and (2) wherein a latch mechanism is disposed at least partially within the step, the entirety of the latch mechanism is offset from the rotation axis, and the latch mechanism is selectively operable by movement of the latch mechanism in a direction substantially parallel to the rotation axis.

8. The aircraft of claim 7, wherein the step surface comprises a continuous surface.

9. The aircraft of claim 7, further comprising:

a lock pin receiver carried by the housing and configured to selectively receive a locking pin of the latch mechanism.

10. The aircraft of claim 9, wherein the latch mechanism comprises a biasing mechanism configured to selectively assist movement of the locking pin.

11. The aircraft of claim 7, further comprising:

a cover carried by the step and disposed generally opposite the step surface.

12. The aircraft of claim 11, wherein the housing further comprises a flange surrounding a perimeter of the cover.

13. A method of operating a folding step, comprising:

providing a housing comprising an interior space;

providing a step carried by the housing, the step having a step surface and a planar load transmitting surface for selectively contacting a planar load reaction surface of the housing and the step being movable relative to the housing and movable between a stowed configuration and a deployed configuration; and moving the step relative to the housing thereby changing an amount of the step that is disposed within the interior space; and moving the step so that at least a portion of the planar load transmitting surface is disposed deeper within the interior space when the step is in the deployed configuration as compared to a maximum depth within the interior space of the step surface when the step is in the stowed configuration;

wherein the step is limited to rotational movement relative to the housing about a rotation axis fixed relative to the housing in both the stowed configuration and the deployed configuration;

wherein the planar load reaction surface is higher than the planar load transmitting surface when the housing and step are in a first orientation and when viewed from a first point of view;

wherein the step surface is relatively higher than all portions of the planar load transmitting surface and the planar load reaction surface when the step is in the deployed configuration while the housing and the step are in the first orientation and while viewed from the first point of view; and at least one of (1) wherein the planar load transmitting surface extends along a plane that is not parallel to a longitudinally central planar portion of the step surface that is completely disposed outside the housing when the step is in the deployed configuration and (2) providing a latch mechanism disposed at least partially within the step, the entirety of the latch mechanism being offset from the rotation axis, and the latch mechanism being selectively operable by movement of the latch mechanism in a direction substantially parallel to the rotation axis.

14. The method of claim 13, further comprising:
operating the latch mechanism to selectively allow movement of the step relative to the housing.

15. The method of claim 13, further comprising:
disposing at least a portion of the housing within a 5 fuselage of an aircraft.

16. The method of claim 15, wherein when the step is in the stowed configuration the step is completely received within the fuselage and wherein when the step is in the deployed configuration at least a portion of the step extends 10 to a space outside the fuselage.

\* \* \* \* \*